United States Patent
Chazen

(10) Patent No.: US 10,471,339 B2
(45) Date of Patent: Nov. 12, 2019

(54) PUZZLE WITH ATTACHABLE AND RELEASABLE PIECES

(71) Applicant: Margo Sheryl Chazen, Las Vegas, NV (US)

(72) Inventor: Margo Sheryl Chazen, Las Vegas, NV (US)

( * ) Notice: Subject to any disclaimer, the term of this patent is extended or adjusted under 35 U.S.C. 154(b) by 0 days.

(21) Appl. No.: 16/011,350

(22) Filed: Jun. 18, 2018

(65) Prior Publication Data

US 2018/0296910 A1    Oct. 18, 2018

Related U.S. Application Data

(63) Continuation-in-part of application No. 15/232,781, filed on Aug. 9, 2016, now Pat. No. 9,999,831.

(60) Provisional application No. 62/202,885, filed on Aug. 9, 2015.

(51) Int. Cl.
| | |
|---|---|
| *A63F 9/10* | (2006.01) |
| *A63F 9/06* | (2006.01) |
| *A63F 9/00* | (2006.01) |
| *G09B 1/06* | (2006.01) |

(52) U.S. Cl.
CPC .......... *A63F 9/1044* (2013.01); *A63F 9/0098* (2013.01); *A63F 9/0666* (2013.01); *G09B 1/06* (2013.01); *A63F 2009/105* (2013.01); *A63F 2009/1022* (2013.01)

(58) Field of Classification Search
CPC ........ A63B 9/1044; A63F 9/0666; A63F 9/10; A63F 2009/105; A63F 2009/1022; A63F 9/0098; A63F 9/1044; G09B 1/10; G09B 1/06

See application file for complete search history.

(56) References Cited

U.S. PATENT DOCUMENTS

| | | | |
|---|---|---|---|
| 1,714,127 | A | 5/1929 | Graham |
| 3,181,869 | A | 5/1965 | Genin et al. |
| 3,510,964 | A | 5/1970 | Dahners |
| 4,205,850 | A | 6/1980 | Craig |
| 4,286,952 | A | 9/1981 | Roche |
| 5,120,226 | A | 6/1992 | Tsai |
| 5,176,521 | A | 1/1993 | McRae |
| 5,190,287 | A | 3/1993 | Ishiyama |
| 5,472,199 | A | 12/1995 | Rainey |
| 5,752,701 | A | 5/1998 | Kao |
| 6,073,929 | A | 6/2000 | Nahon |
| 6,626,678 | B2 | 9/2003 | Forbes |
| 6,648,715 | B2 | 11/2003 | Wiens et al. |
| 7,490,831 | B2 | 2/2009 | Simmons |
| 9,999,831 | B2 * | 6/2018 | Chazen ................. A63F 9/1044 |

(Continued)

FOREIGN PATENT DOCUMENTS

EP    2281617 B1    2/2013

*Primary Examiner* — Steven B Wong
(74) *Attorney, Agent, or Firm* — Connie R. Masters

(57) ABSTRACT

The puzzle with attachable and releasable pieces includes shaped puzzle pieces and a two-part base, which includes a front base section and a back baseplate. The puzzle pieces have rear-facing engaging mechanisms that are attachable to forward-facing male studs carried by the back baseplate. The puzzle pieces each have a particular outer shape determining placement. The puzzle may be stored with the puzzle pieces engaged to the back baseplate, but the puzzle pieces may be later released for repeat play by using a provided puzzle release mechanism.

20 Claims, 18 Drawing Sheets

(56) References Cited

U.S. PATENT DOCUMENTS

| | | | |
|---|---|---|---|
| 10,173,127 B2 * | 1/2019 | Chazen | .................... A63F 9/10 |
| 2005/0227573 A1 | 10/2005 | Lin | |
| 2007/0278740 A1 | 12/2007 | Mao | |

* cited by examiner

PUZZLE WITH ATTACHABLE AND RELEASABLE PIECES

CROSS-REFERENCE TO RELATED APPLICATIONS

This continuation-in-part application claims the benefit of U.S. patent application Ser. No. 15/232,781 filed on Aug. 9, 2016, now U.S. Pat. No. 9,999,831, which claimed the benefit of U.S. Provisional Patent Application No. 62/202,885, filed on Aug. 9, 2015, both of which are incorporated herein in their entirety.

FIELD OF INVENTION

This invention relates generally to puzzles, and, more particularly, to a puzzle with pieces that have an outer shape determining placement, a connection to a base enabling storage or display, and a release mechanism to release the pieces from the base for play.

BACKGROUND OF THE INVENTION

Puzzles have an artistic and educational appeal as well as presenting an intellectual challenge. Typically, puzzles are assembled by matching a number of interlocking irregularly cut puzzle pieces to form a planar pictorial illustration on the surface of the puzzle. The assembling of a puzzle by a child user enhances physical skills (hand-eye coordination, fine motor skills), cognitive skills (visual discrimination, sorting, classifying, analyzing, deducing), and emotional skills (patience with a reward for completion) as well as providing play value.

However, storage of puzzles with interlocking puzzle pieces is problematic for parents, schools, child care facilities, and the like, because the pieces are not securable to the puzzle base, so cannot be stored as a cohesive unit.

Display of a finished puzzle provides similar challenges. Though the pieces of a finished puzzle can be fixedly attached to the puzzle base for display (such as by permanently gluing the puzzle pieces to the base, thereby preventing disconnection and allowing vertical display on a wall), this operation precludes repeat assembly, thereby limiting the skill enhancement opportunities and play value of the puzzle.

There is a need for a puzzle with shaped pieces that provides amusement and an educational challenge for the child user while providing pieces that are easily attachable to create a cohesive unit for storage or display, and yet are releasable for repeat play.

BRIEF SUMMARY OF THE INVENTION

The present invention is directed to a puzzle, particularly a puzzle suitable for pre-school-age children, which allows the typical play pattern of a preschooler who analyzes and attempts to properly assemble the puzzle, yet differs from a typical puzzle in that the pieces can be snapped down onto a studded back baseplate for storage or display. This provides the advantages that the pieces cannot fall out or get lost and that the puzzle may easily be stored or displayed vertically. Further, a release mechanism is provided, so the pieces can be released for repeat play.

The inventive puzzle includes a two-part base (a front base section and a back baseplate) and puzzle pieces that are attachable to the back baseplate portion of the two-part base. An engagement mechanism is disposed on the back of the puzzle pieces, and a complementary engagement mechanism is disposed on the front surface of the back baseplate. Though shown, and referred to generally, as engagement or coupling mechanisms on the rear of the puzzle pieces that are frictionally engageable with male studs on the front of the back baseplate, other complementary engagement mechanisms are within the scope of the invention. When attached, a portion of the front base section is interposed between each puzzle piece and the back baseplate.

To release the puzzle pieces that are attached to the front studs of the back baseplate, the front base section and back baseplate are moved from a closer attachable position to a further releasable position. In the attachable position, the front base section is nearer to the back baseplate than in the releasable position. When the distance between the front base section and the back baseplate increases causing them to move into the releasable position, the puzzle pieces are pulled upward away from the back baseplate by the portion of the front base section that is interposed between the puzzle pieces and the back baseplate, which disengages the puzzle pieces' engagement mechanisms from the complementary back baseplate engagement mechanisms, thereby freeing the puzzle pieces from the back baseplate.

In the first embodiment, the interposed portion of the front base section is a lip, and the puzzle piece's coupling mechanisms must be sufficiently long to reach past the lip to attach to the baseplate studs below. To release the puzzle pieces, the back baseplate is forced backward to increase the distance between the back baseplate and the front base section to reach the releasable position, but the attached puzzle pieces are caught on the lip of the front base section and cannot follow the back baseplate downward. The complementary engagement mechanisms become disassociated, and the puzzle pieces are released to fall in the direction of the gravitational force.

In a second embodiment, the interposed portion of the front base section is a perforated thin, flat sheet. The perforated flat sheet is interposed between with the puzzle piece's coupling receptacle(s) and corresponding baseplate stud(s). In this case, the puzzle piece's coupling mechanisms must be sufficiently long to reach through the perforations to attach to the baseplate studs below. The puzzle pieces are released from the male studs when the front base section is moved forward via a lever-type puzzle release mechanism to increase the distance between the back baseplate and the front base section, bringing them into the releasable position. In contrast to the first embodiment, in which the back baseplate is moved downward, in the second embodiment, the front base section is moved upward. The non-perforated interstitial portions of the perforated flat sheet catch the outer edges of the puzzle pieces, causing the puzzle pieces to be pulled forward to disengage the complementary coupling of the puzzle pieces to the back baseplate.

In the third embodiment, as in the first embodiment, the interposed portion of the front base section is a lip. However, as in the third embodiment, to release the puzzle pieces, the front base section is moved upward via a lever-type puzzle release mechanism to increase the distance between the back baseplate and the front base section to release the puzzle pieces.

In an additional aspect, the puzzle pieces are also attachable to a studded baseplate to enhance the range of play possibilities.

An object of the present invention is to provide convenient storage or display of puzzle pieces through providing an attachable and releasable puzzle format.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Figure 1:
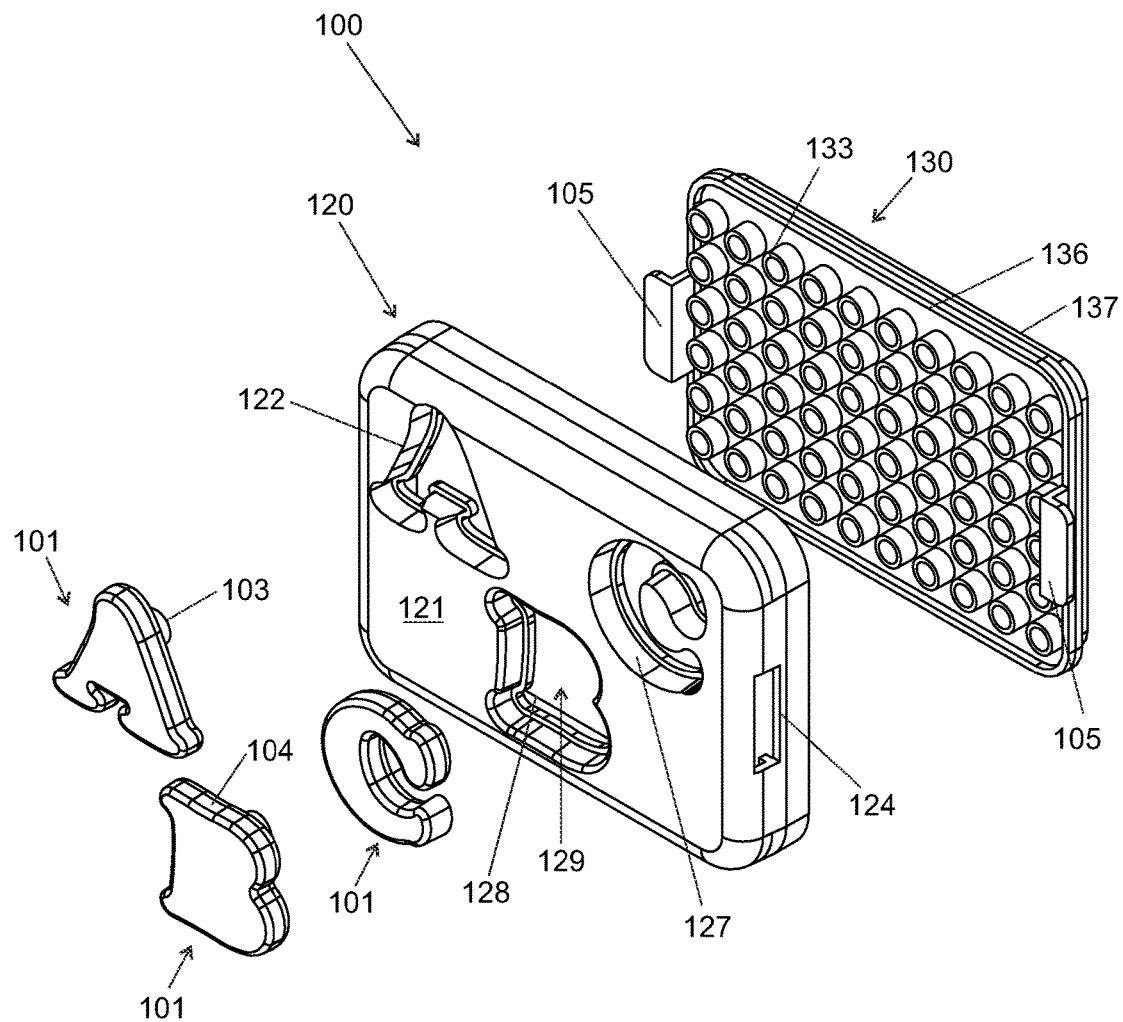
FIG. 1 is an exploded front perspective view of the first embodiment of the puzzle with attachable and releasable pieces of the present invention, showing a first pre-determined design.

Shown throughout the figures, the present invention is directed toward a puzzle with attachable and releasable pieces, which is generally referred to as puzzle unit 100. The inventive puzzle unit 100 provides the skill enhancement opportunities, play value, and educational value of a standard puzzle for young children, yet provides for convenient attachment of the puzzle pieces 101 for storage and/or display and also provides easy releasing of the puzzle pieces 101 for repeat play. When in the storage/display mode, the pieces 101 will not fall out if the puzzle unit 100 is turned upside down, turned on one of its sides, or stored or displayed vertically.

The inventive puzzle unit 100 includes at least one puzzle piece 101 (typically multiple pieces 101), a two-part base 120, 130, and a puzzle release mechanism 105. The two-part base comprises a front base section 120 and a studded back baseplate 130, which are attached by complementary front-to-back attachment mechanisms that allow the distance between the front base section 120 and back baseplate 130 to be increased or decreased to a limited extent.

In the first embodiment of the invention the puzzle release mechanism 105 comprises a set of manually manipulatable tabs firmly attached to the back baseplate 130 that lowers the back baseplate 130, and in the second and third embodiments it comprises a set of manually articulated levers that raise the front base section 120. In both cases, the puzzle release mechanism 105 serves to increase the distance between the front base section 120 and the back baseplate 130, thereby moving the front base section 120 and back baseplate 130 into the releasable position and releasing the attached puzzle pieces 101 from the back baseplate 130.

In the illustrated aspect, the back baseplate 130 comprises a flat, rigid sheet or foundation 131 (FIG. 5) arranged with a number of upwardly-protruding coupling elements, projections, pegs, or the like, referred to as male studs 133. Each of the male studs 133 is configured to be frictionally engaged with an engagement mechanism 103 disposed on the rear of a puzzle piece 101. The male coupling studs 133 are preferably arranged on the same side of the back baseplate foundation 131 in equidistant rows, but other arrangements can also be utilized.

Figure 27:
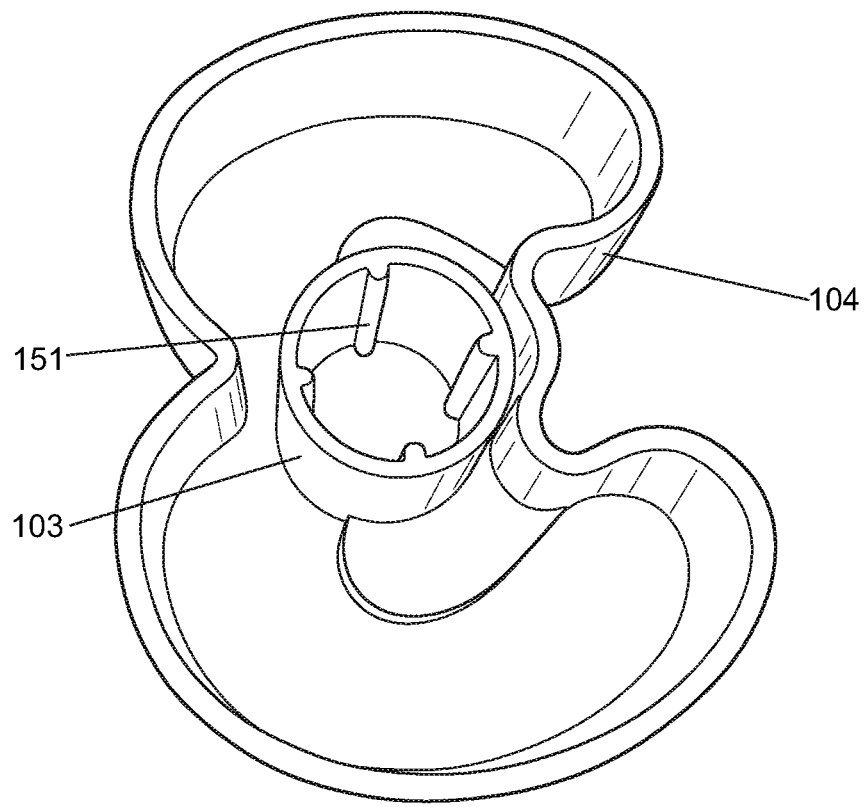
FIG. 27 is a rear perspective view of a single puzzle piece of the puzzle of the present invention.

The rear portion of each puzzle piece 101 is configured with one or more rear-facing engagement mechanisms 103 sized and configured to couple to, or be interlocked with, the complementary forward-facing male coupling studs 133 on the front surface of the studded back baseplate portion 130. The puzzle piece's rear-facing engagement mechanisms 103 may be in any of a variety of shapes. For example, the engagement mechanisms 103 may be open female slots, may be cylindrical 113 (FIG. 17) with inner ribs or ridges 151 (FIGS. 6, 17, 27), may be formed in shapes allowing portions of plastic to frictionally engage with one or more portions of the outside of the male coupling studs 133, may be cylinders having an outer circumference equal to the diagonal distance between two male studs 133 to allow four outer portions of the cylinder to frictionally engage with four male studs 133, or may be otherwise designed to frictionally connect with or onto the male coupling studs 133. This engagement mechanism 103 allows the puzzle piece to attach not only to the puzzle of the instant invention, but also to a standard baseboard with protruding male studs, as seen in FIG. 27.

Preferably the engagement mechanism 103 disposed on the rear of one puzzle piece comprises one or multiple cylinders 113 extending slightly below the outer shaped edges 104 of the puzzle piece 101. The depth of this extension below the shaped edges 104 is sufficient to allow the template or base front lip 128 of the base front portion 120 to be interposed between the bottom of the outer shaped edge 104 and the top of the male coupling studs 133. This depth may be in the range of 2 to 8 mm. The cylinder 113 is preferably configured with multiple (three or more) inner ribs or ridges 151, such as, for example, the four inner ribs 151 seen in FIG. 27.

Figure 2:
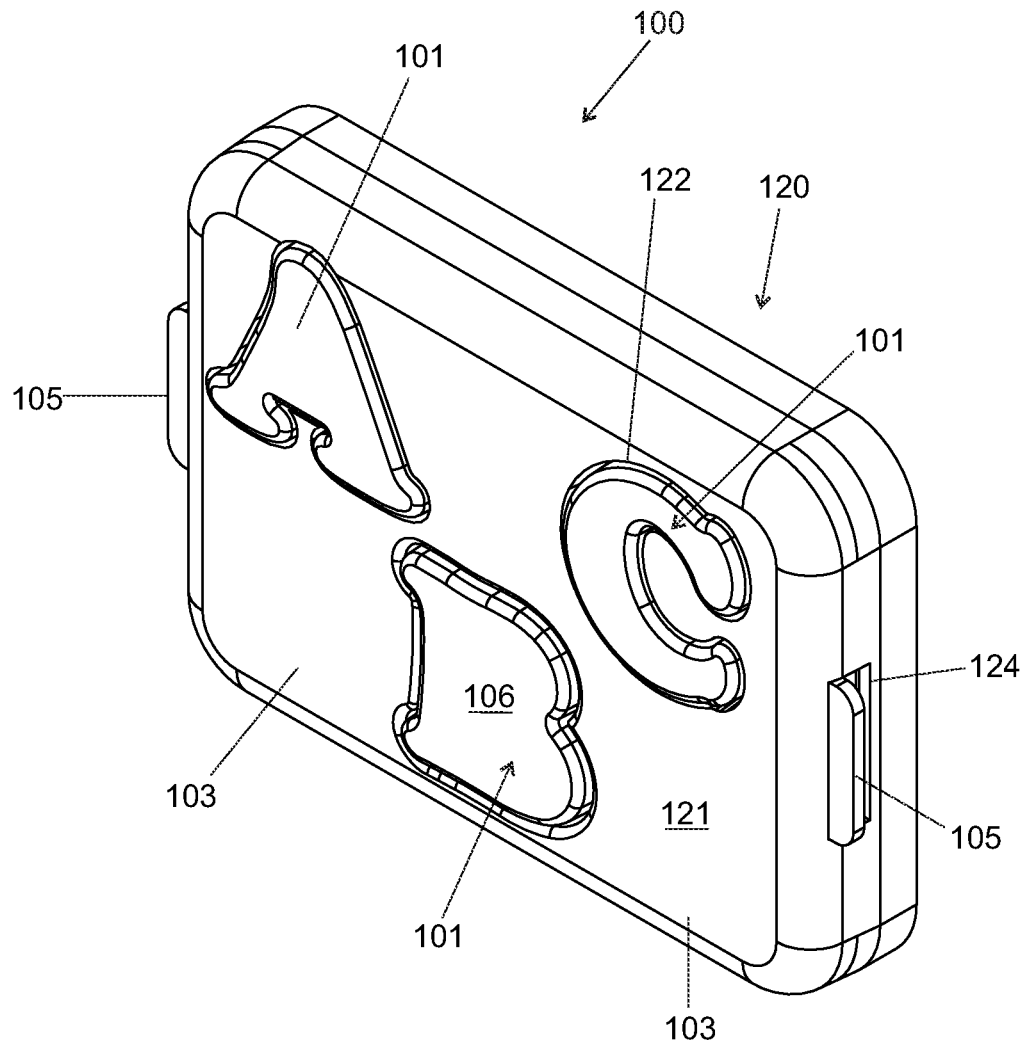
FIG. 2 is a front perspective view of the assembled first embodiment of the inventive puzzle.
Figure 3:
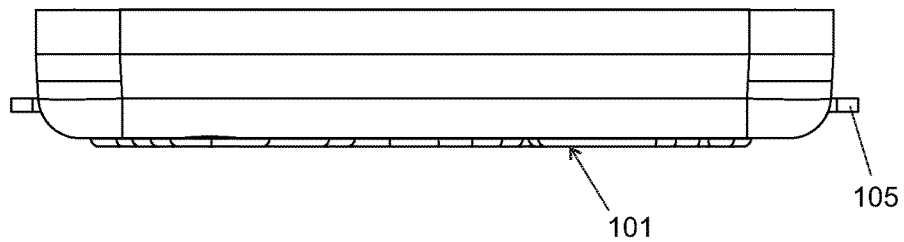
FIG. 3 is a top view of the inventive puzzle.
Figure 4:
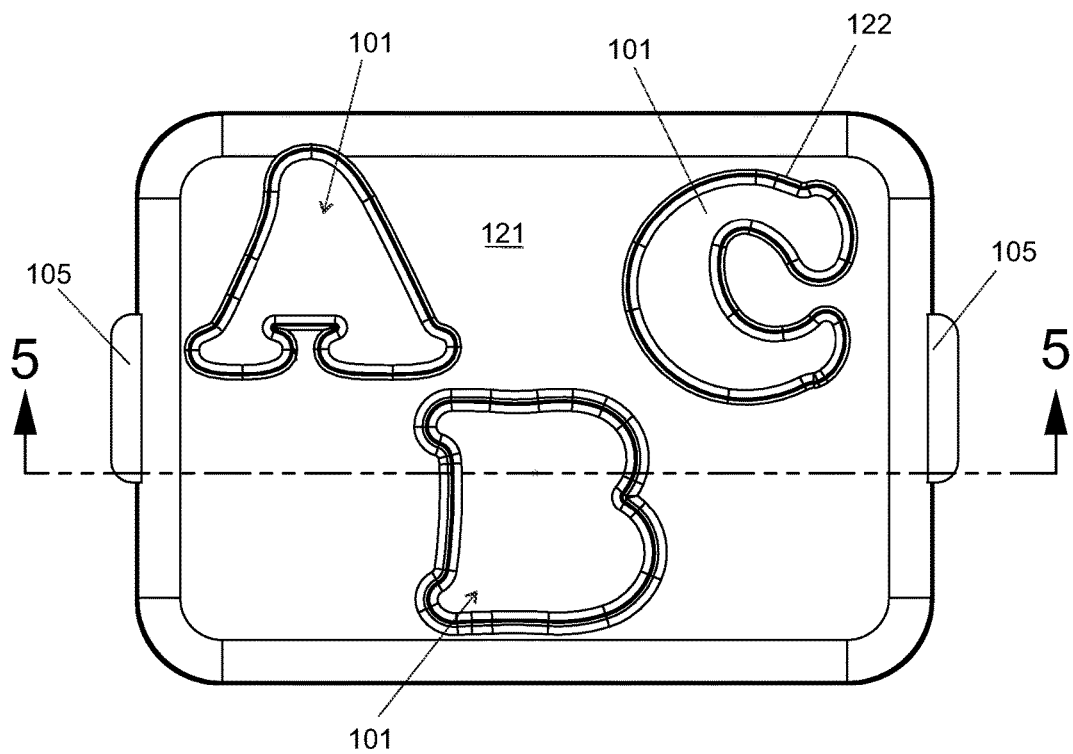
FIG. 4 is a front view of the first embodiment of the inventive puzzle.

The front of each puzzle piece 101 is a puzzle piece front surface 106 (FIG. 2), which preferably carries a decorative presentation that provides artistic interest, amusement, and/or informational content. For example, in FIG. 2, the front surface 106 can carry a graphical presentation to show the letter "B," to focus the child on the shape of the letter "B," to amuse the child with a silly graphic relating to the letter, to enhance the interest of the child, or to otherwise enhance the appearance of the front of the puzzle piece 101. The graphical presentation (not shown) may be applied to the front of the puzzle piece in any manner known in the art, including printing, imprinting, embossing, embellishing, painting, adherence of a label or decal, or other application means, or it may optionally be incorporated into the molded puzzle piece itself.

The front of each puzzle piece 101 may have a flat front surface 106, as shown in the "A" shape of FIG. 1, with a graphic (not shown) to be applied to define the "A" designation. Or the front of the puzzle piece 101 may have a raised designation portion with a null space 145, such as shown in the "U," "C," and "O" shapes of FIG. 8. The null space 145 is a surface recessed below the front surface 106, thereby becoming unimportant and/or having negligible consequence to the user of the puzzle. But the null space 145 may provide efficiencies in manufacturing and increases in robustness of the piece.

The puzzle pieces 101 have shaped edges 104. The pre-determined shape of the outer shaped edges 104 corresponds with a correlating pre-determined shape of a puzzle piece-receiving hole 129 and thus determines placement of the puzzle piece 101. In the first and third embodiments, the front base section 120 is configured with puzzle piece-receiving holes 129 defined by cutout edges 122 having a shape corresponding to the shape of the shaped edges 104. In the second embodiment of FIGS. 7-24, a template 110 is configured with puzzle piece-receiving holes 129 defined by cutout edges 112 shaped to receive the puzzle pieces 101.

The engagement of the puzzle piece's engagement mechanisms 103 to the forwardly-extending male studs 133 of the back baseplate attaches the puzzle pieces 101 to the back baseplate 130. To disengage the puzzle pieces 101 and release them from the back baseplate 130, the front base section 120 is moved from an attachable position to a releasable position. Best seen in FIG. 17, in the attachable position, the front base section 120 is nearer the back baseplate portion 130 than in the releasable position seen in FIG. 16.

Turning to the first embodiment of FIGS. 1-6, the front face 121 of the front base section 120 is configured with one or, preferably, multiple, puzzle piece-receiving holes 129 defined by cutout edges 122 with the edges 122 extending the depth of the front base section 120 from an outer edge at the front face 121 to an inner or rear edge at lip 128 and including an interior wall 127. A particular puzzle piece-receiving hole 129 having a particular cutout edge 122 shape correlates in shape to the outer shape 104 of a particular corresponding puzzle piece 101. In this embodiment, each receiving hole 129 has a front face flange or lip 128 (FIG. 1) extending slightly inwardly at the back edge of the interior wall 127 into the receiving hole 129.

When the puzzle piece 101 is fitted into its corresponding hole 129, the front face lip 128 of the front base section 120 projects inwardly below the back outer edge of the puzzle piece 101. When the puzzle piece 101 is engaged, the front face lip 128 is interposed between the lower edge of the puzzle piece wall outer shape 104 and the front surface of the back baseplate 130 or the front surface of the studs of the back baseplate.

The puzzle piece 101 fits within the corresponding hole 129, whether or not the puzzle piece's engagement mechanism(s) 103 is engaged with the back baseplate's male stud(s) 133. The puzzle piece 101 will fit into the receiving hole 129 in the manner of a typical non-attachable puzzle piece, which may provide a method of play that is particularly suited to a young child who cannot, or does not desire to, attach the puzzle pieces 101 to the back baseplate 130. However, the option for attachment remains. For example, when an adult chooses to store the inventive puzzle unit 100, the puzzle piece 101 can merely be pushed deeper into the receiving hole 129 with its one or multiple rear-facing engagement mechanisms 103 engaging with one or multiple ones of the baseplate forward-facing engagement mechanisms 133.

In the first embodiment, the puzzle release mechanism 105 is a set of tabs that may be fixedly attached to the studded back baseplate 130 or that may be molded integrally with a plastic studded back baseplate 130.

Figure 5:
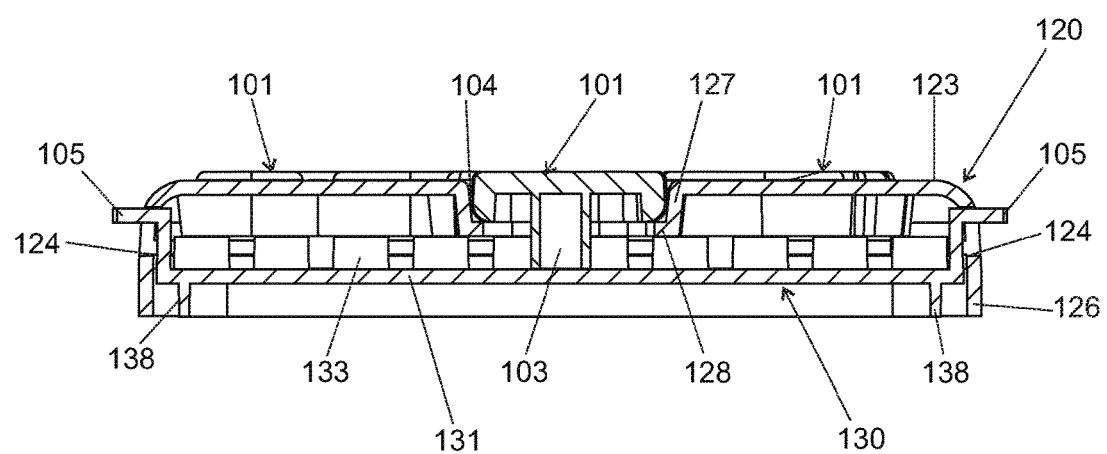
FIG. 5 is a view taking along the viewing line 5 of FIG. 4.

The front base section 120 includes a generally flat front middle surface 121 that extends outwardly in four directions toward side corners 123 (FIG. 5). Side corners 123 are integrally formed with (or attached to) side flange 126. Side flange 126 extends around the exterior of the four sides (two lateral and two longitudinal sides) of the toy; two opposing sides (shown as lateral sides) of side flange 126 are configured with tab holes defined by tab hole edges 124.

The set of tabs 105 are disposed on the outer sides of the back baseplate 130 and extend outwardly through the tab holes defined by tab hole edges 124 through the side flange 126 of the front base section 120; they extend a sufficient distance past the tab hole edges 124 to be manually gripped. Sufficient interior clearance within the side flange 126 is provided for the back baseplate 130 to be pushed downward, but because the base flange 138 extends outwardly past the bottom of the back baseplate 130 during this procedure, the puzzle unit must be lifted off any hard surface, such as a table or floor.

In this first embodiment, after removing the puzzle unit from any hard, flat surface, the puzzle pieces 101 are released by grasping the back of side flange 126 and pressing down on the tabs 105 towards the bottom of the unit, which moves the back baseplate 130 farther from the front base section 120 into the releasable position. The puzzle pieces 101 release from the back baseplate 130 as they are forced forward by the front face lip 128 at the back of the interior wall 127 of the front base section 120 as the distance between the front base section 120 and the back baseplate 130 increase, which is designated the releasable position. The puzzle pieces 101 will fall out with gravity as the back baseplate 130 pulls away from the puzzle pieces 101 captured by the front base section 120.

In this embodiment, when the puzzle unit is placed back onto a hard surface, such as a table or floor, the baseplate flange 138 touches the hard surface and pushes the studded back baseplate 130 upwards, reducing the distance between the front base section and the back baseplate. The lifting of the studded back baseplate 130 stops when the tabs 105 reach the top of the tab hole edges 124 (FIG. 5) with the base flange 138 resting on the hard surface. In this configuration, the back baseplate 130 has moved nearer to the front base section 120 and is in the attachable position. The puzzle unit 100 is now in the position in which the puzzle pieces 101 can be placed into the puzzle piece-receiving hole 129 and/or can be snapped down to the back baseplate 130 once again.

To use the first embodiment, a child attempts to insert the correct puzzle pieces 101 into the corresponding shaped hole 129 defined by cutouts 122 of the front base section 120. The particular puzzle piece 101 that matches a particular hole 129 is then inserted into the corresponding hole 129 with the outer edges of the puzzle piece 101 abutting the inner wall 127 of the shaped hole 129. This play pattern may be continued until all puzzle pieces 101 have been matched to their corresponding holes 129.

Typically, a young child would be likely to play with the puzzle pieces and insert them into the proper puzzle piece-receiving hole 129 defined by cutout edge 122 without pushing the pieces 101 down firmly enough to engage the puzzle piece's engagement mechanisms 103 with the back baseplate's male studs 133. If the child wants to play longer, the puzzle unit can be turned upside down and the pieces 101 will typically fall out and be available for more play.

When the child finishes playing, and the adult caregiver wishes to store the puzzle unit 100, the adult caregiver presses on the top surface 106 (FIG. 2) of each puzzle piece 101 to push each of the pieces 101 further downward into the correspondingly-shaped hole 129 to engage the puzzle piece's engagement mechanisms 103 with the male studs 133 (unless the child has already engaged them). The puzzle unit 100 may then be stored with the pieces 101 firmly attached.

After storage, when the child wishes to play with the puzzle unit 100 again, the adult caregiver picks up the entire unit and presses down on the side tabs toward the bottom of the unit. At that point the baseplate flange 138 extends below the bottom of the side flange 126 (FIG. 5) of the front base section 120, and the distance between the top of the front base section and the back baseplate 130 increases to reach the releasable position. The back baseplate 130 is separated from the back of the puzzle pieces, but the front face lip 128 prevents the puzzle pieces 101 from following the back baseplate 130 downward. The puzzle pieces 101, therefore, fall out. Then the puzzle unit 100 is placed on a hard surface and the baseplate flange 138 lifts the internal back baseplate 130; the lifting of the back baseplate 130 is stopped when the tabs 105 reach the top edge 124 of the tab holes of the front base section 120. At this point, the child can again play with the puzzle, and the pieces 101 can be re-attached to the inner baseplate when desired.

The second embodiment of the invention is shown in FIGS. 7-24 with several pre-determined exemplary designs provided. The second embodiment differs from the first embodiment at least in the inclusion of a template 110, in the inclusion of perforations in the front base section 120, and in the method and mechanism to move the front base section 120 and back baseplate 130 from the attachable position to the releasable position and vice versa.

In the second embodiment, a template 110 is provided that can preferably be removably attached to the front of the front base section 120 (such as via connection mechanism 119 (FIG. 9) that connects with front base section's complementary connection mechanism 153) but can optionally be permanently attached. Preferably the template 110 having a first design can be attached and used to indicate the proper corresponding puzzle pieces 101 for a first pre-determined design pattern, and then the template 110 of the first design can be removed and replaced with a template 110 having a second design to add play value, increase versatility, and enhance the usefulness of the toy puzzle unit 100.

The template 110 is a flat, relatively thin sheet of material with upper or front and lower or back broad flat sides, opposing perimeter lateral sides and opposing perimeter longitudinal sides. The template may be formed of known materials, such as laminated or un-laminated paperboard, cardboard, plastic, layered composites, or the like. The template 110 upper surface preferably carries a decorative graphical presentation to add visual interest. The template opposing lateral sides are preferably configured with a connection mechanism 119 in the form of outwardly extending tabs which are insertable into complementary slots of the connection mechanism 153.

The template 110 also includes puzzle piece-receiving holes 129 defined by cutout edges 112. Each puzzle piece-receiving hole 129 is shaped to receive a corresponding-shaped puzzle piece 101. The cutout edges 112 extend from the front surface through the body of the thin sheet to the back surface.

Figure 9:
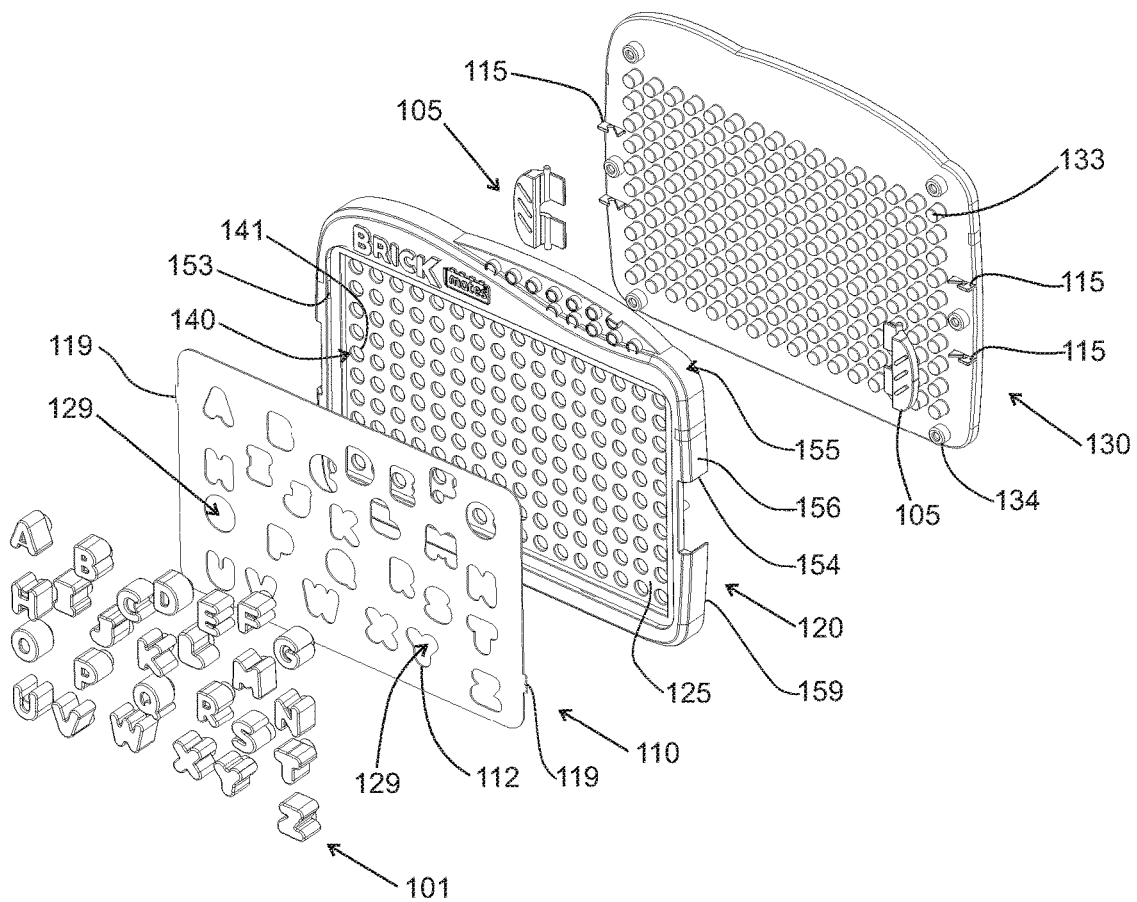
FIG. 9 is a front exploded view of the second embodiment of the inventive puzzle.
Figure 10:
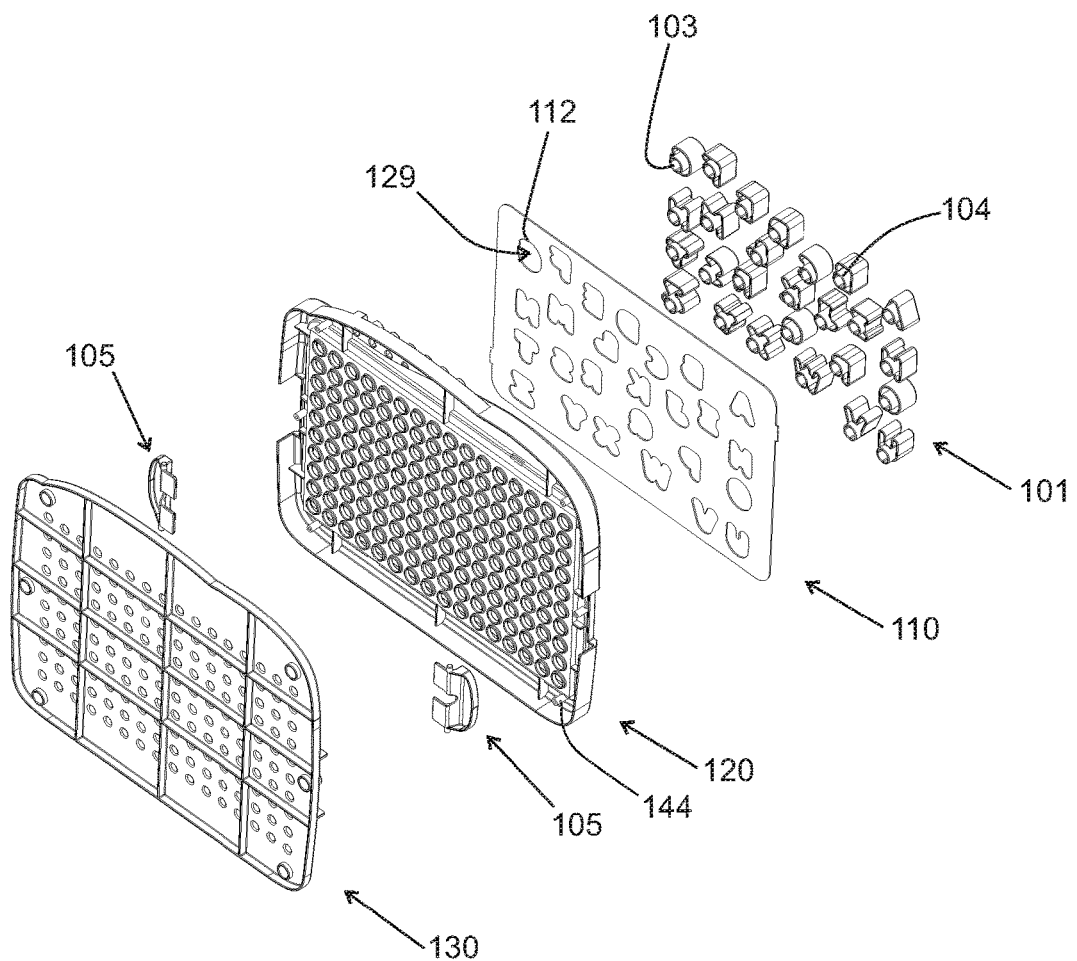
FIG. 10 is a rear exploded view of the second embodiment of the inventive puzzle.
Figure 14:
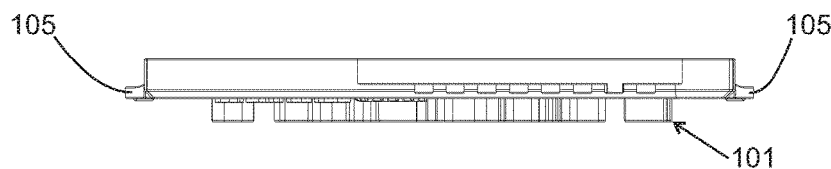
FIGS. 11-15 are front, lower side, right side, upper side, and left side views, respectively, of the second embodiment of the inventive puzzle.
Figures 11, 13, 15:
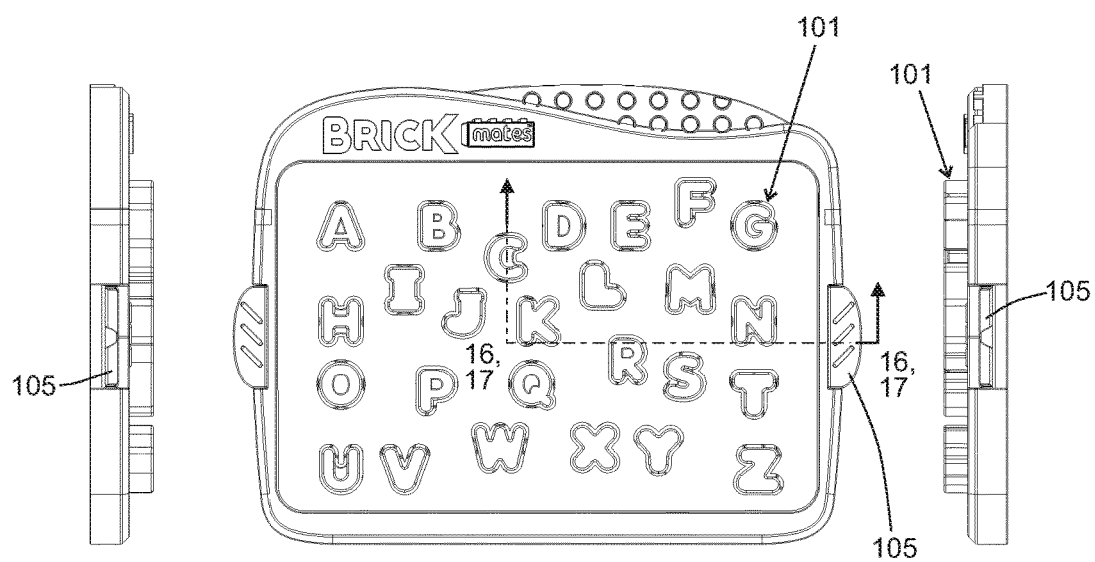
Figure 12:
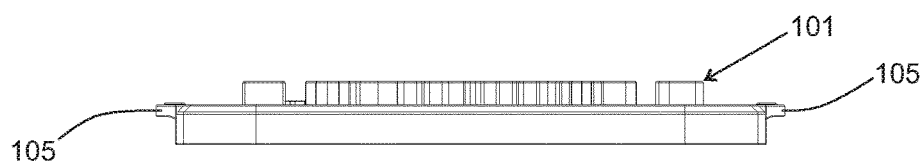
Figure 25:
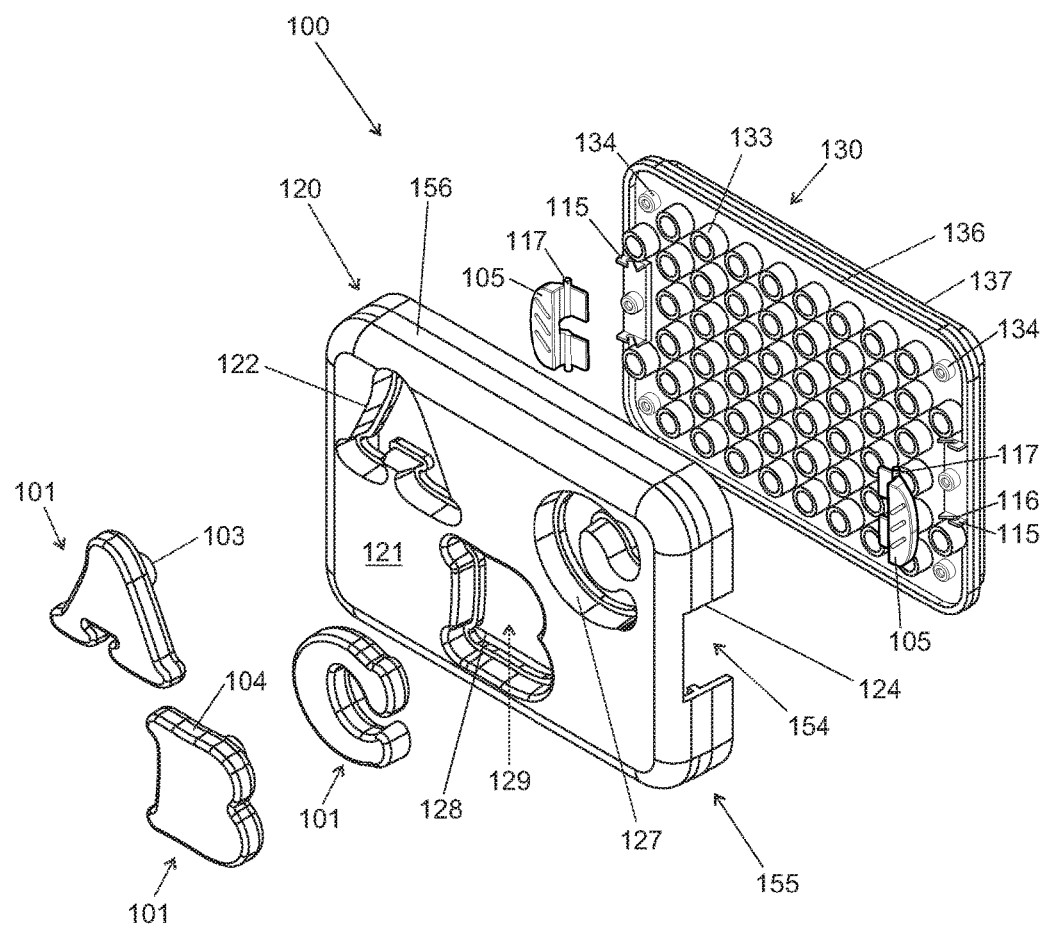
FIG. 25 is an exploded front perspective view of a third embodiment of the puzzle with attachable and releasable pieces of the present invention that includes a lever-type puzzle release mechanism.
Figure 26:
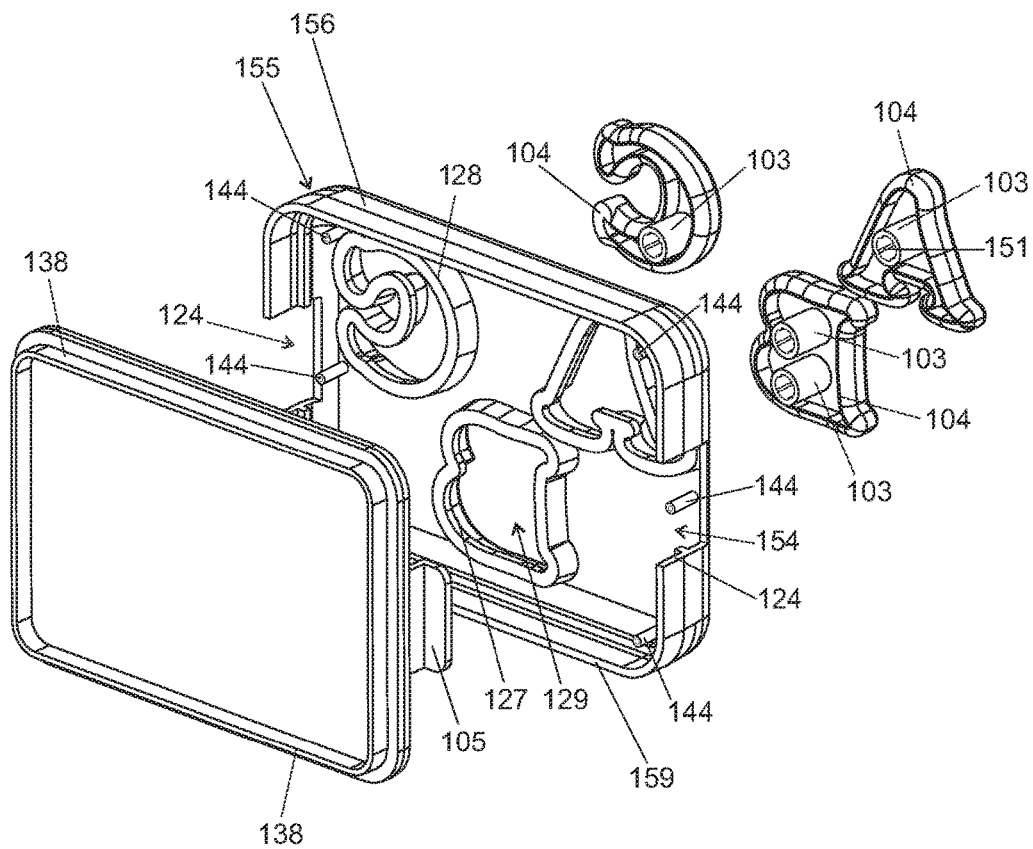
FIG. 26 is an exploded rear perspective view of the third embodiment of the puzzle of the present invention.

The front base section 120 of the second embodiment has an interior flat perforated section 125 (FIG. 9) surrounded and supported by an outer frame 155. The outer frame 155 includes side flanges 156 forming the sides of the toy, as shown. Side flanges 156 reach from the outer corners downwardly to end at bottom flange edge 159, but, as seen in FIGS. 9,25, 26 form only a partial side wall on two opposing sides, with lever-accommodating openings 154 disposed within each of the two opposing side flanges 156. Various decorative elements may be incorporated into, or printed onto, the outer frame 155, such as the decorative wave 182 (FIG. 20), a logo, instructions, or the like.

The flat interior perforated section 125 is configured with multiple perforations 140 defined by perforation edges 141 with flat, interstitial non-perforated portions (labeled with reference number 125 in FIGS. 16-17) interspersed between the perforations 140. The layout of the perforations 140 corresponds to the layout of the back baseplate's rear-facing engagement mechanism (shown as male studs 133). In the exemplary aspect shown in FIGS. 16-17, the male coupling studs 133 are aligned with the puzzle piece's rear-facing engagement mechanisms 103; thus, in this exemplary aspect, the perforations 140 are aligned with the male studs 133 with non-perforated interstitial portions aligned with the area of the baseplate between the studs. However, the particular correspondence is dependent upon the particular type of the puzzle piece-to-baseplate complementary coupling mechanism utilized. This is because other sets of forward-facing engagement mechanisms 133 and rear-facing engagement mechanisms 103 are within the scope of the invention, and the use of a different complementary set may necessitate a different correspondence.

The puzzle pieces 101 are constructed as in the first embodiment in that they include a puzzle piece front surface 106 (FIG. 2) that is typically graphic-embellished and may include a null portion 145 (FIG. 21), outer shaped edges 104 that are pre-determined to correspond to a shape of a puzzle piece-receiving hole 129, and one or more rear-facing engagement mechanisms 103 sized and configured to couple to, or be interlocked with, the complementary forward-facing male coupling studs 133 on the front surface of the studded back baseplate portion 130.

In the second embodiment of the invention, the back baseplate 130 is configured with complementary front-to-back attachment mechanisms that allow limited movement, shown here as slide-able female connectors 134 (FIG. 9) that coordinate with complementary connectors shown here as slide-able shaft male connectors 144 (FIG. 10) disposed on the back of the front base portion. A stop device limits the retraction of the slide-able shaft male connector from the slide-able receptacle female connector, thus limiting the sliding distance. The slide-able female connector 134 may be a tube or open cylinder sized to receive the slide-able shaft male connector 144. The complementary back and front base connectors 134, 144 enable the secure attachment of the back baseplate 130 to the front base portion 120 while allowing for the limited amount of movement necessary for the disengagement of the puzzle pieces.

Figure 16:
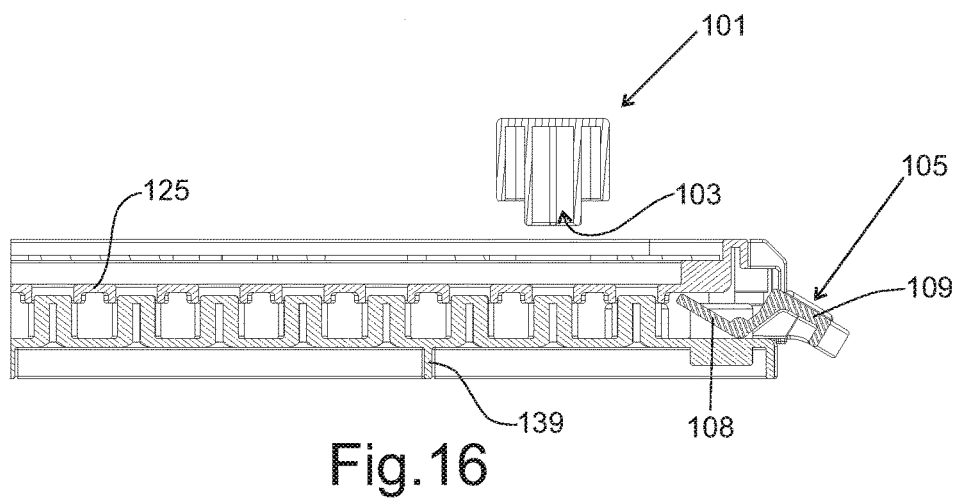
FIG. 16 is a cut view taken along the line 16 in FIG. 18 showing the lever of the lever-type puzzle release mechanism rotated into the releasable position, thereby increasing the distance between the front base section and the back baseplate, with a single block shown as released.
Figure 17:
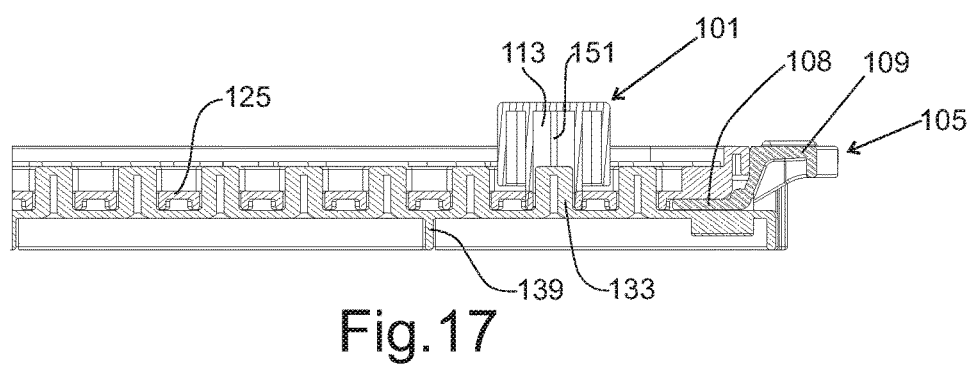
FIG. 17 is a cut view taken along the line 17 in FIG. 18 showing the lever in the resting position, thereby allowing the front base section to be in the attachable position with a single block shown attached.

The puzzle release mechanism 105 of the second embodiment is a lever, best seen in FIGS. 16-17. The lever-type puzzle release mechanism 105 has an inner engagement portion 108 configured to engage with the front base section 120 and has an outer handle portion 109 that can be manually pushed upward or downward. The lever puzzle release mechanism 105 is shown as being pivotally connected with its fulcrum on the back baseplate 130. The fulcrum is a portion of a release receiver 115 that projects forwardly from the back baseplate 130 and includes two aligned slots 116 that accommodate a handle cylindrical portion 117. When the outer handle portion 109 of the lever puzzle release mechanism 105 is pushed downward, as in FIG. 16, the front base section 120 is moved upward away from the back baseplate 130 and the distance between the front base section 120 and back baseplate 130 is increased, causing the puzzle pieces 101 to be forcibly released. When the handle portion 109 is released to move back upward, the force of gravity (or, optionally, a spring system between the front base section 120 and back baseplate 130 could be provided for more secure positioning) causes the distance between the front base section 120 and back baseplate 130 to decrease, allowing the puzzle pieces 101 to be attached. In this attachable position, as seen in FIG. 17, the interstitial solid areas amongst the perforations of the interior flat surface 125 of the base front section 120 are again positioned amongst the back baseplate's male coupling studs 133.

Figure 8:
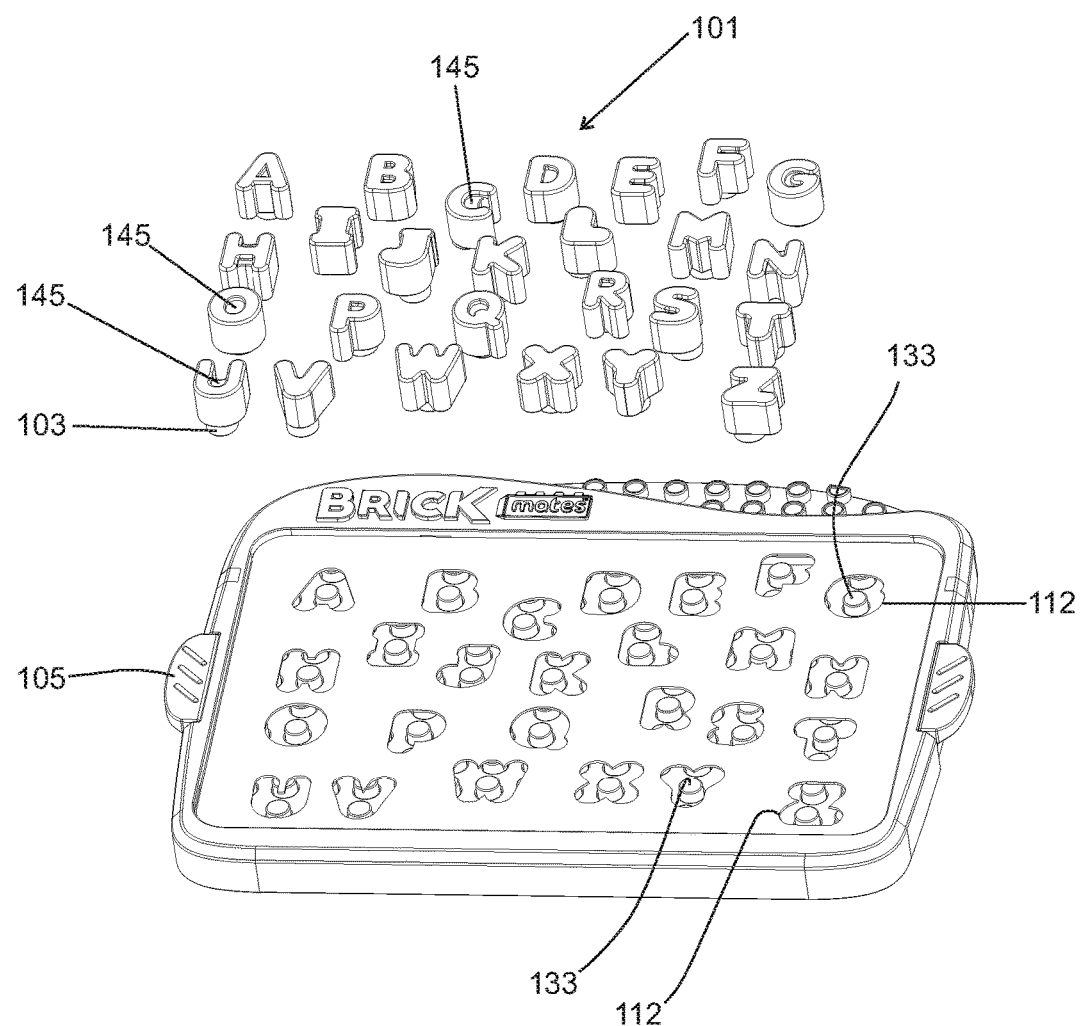
FIG. 8 is a front perspective view of the second embodiment of the inventive puzzle that is ready to assemble.

As seen in FIG. 8, a puzzle piece 101 of a particular shape can be inserted into the puzzle piece-receiving hole 129 of the corresponding particular shape. The forward-facing male coupling studs 133 of the back baseplate can be seen through the puzzle piece-receiving holes 129.

In the third embodiment of FIGS. 25-26, as in the first embodiment, the front face 121 is configured with one or more puzzle piece-receiving holes 129 defined by cutout edges 122 having a shape that correlates to the outer shape 104 of a particular corresponding puzzle piece 101 (which are constructed as in the other embodiments). This front face lip 128 projects inwardly below the back outer edge of the puzzle piece 101, when the puzzle piece 101 is positioned in its corresponding hole 129 and the puzzle piece's engagement mechanism(s) 103 are coupled with the back baseplate's male stud(s) 133. The lip 128 is interposed between the puzzle piece outer edge and the front surface of the back baseplate 130.

The third embodiment varies from the first embodiment in the method and mechanism to move the front base section 120 and back baseplate 130 from the attachable position to the releasable position and vice versa. In contrast to the first embodiment (in which the puzzle release mechanism 105 is a set of tabs) the puzzle release mechanism 105 of the third embodiment is a lever-type puzzle release mechanism 105, as in the second embodiment and as described above.

As in the second embodiment, the third embodiment includes the complementary front-to-back attachment mechanisms that allow limited movement, which are illustrated as slide-able female connectors 134 (FIG. 25) disposed on the front of the back baseplate 130 that coordinate with complementary connectors, which are illustrated as slide-able shaft male connectors 144 (FIG. 26) disposed on the back of the front base portion.

Figure 28:
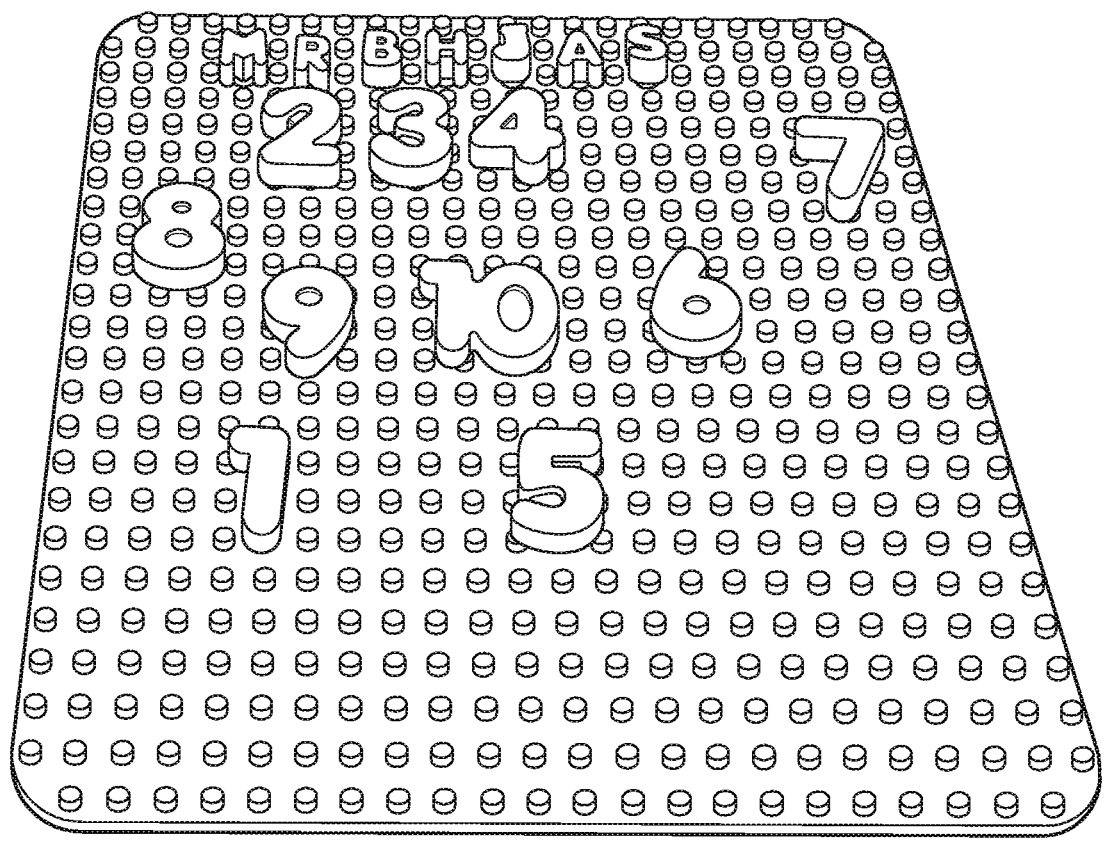
FIG. 28 is a perspective view of a variety of puzzle pieces of the present invention attached to a studded baseplate.

In a further aspect shown in FIG. 28, puzzle pieces usable with the puzzle of the instant invention are additionally usable with a standard baseplate having protruding male studs 133.

Preferably, the puzzle pieces 101, back baseplate 130, and front base portion 120 are formed of plastic material or are formed substantially of plastic material.

Figure 6:
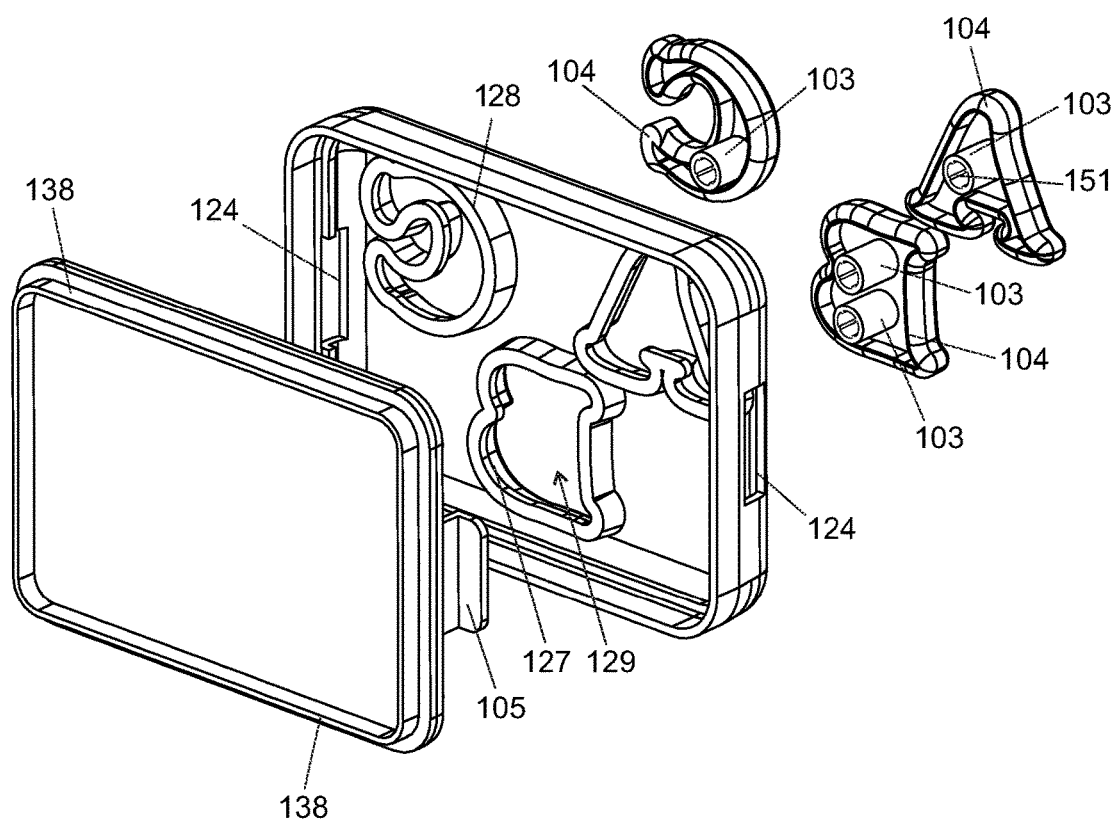
FIG. 6 is an exploded rear perspective view of the first embodiment of the inventive puzzle.
Figure 7:
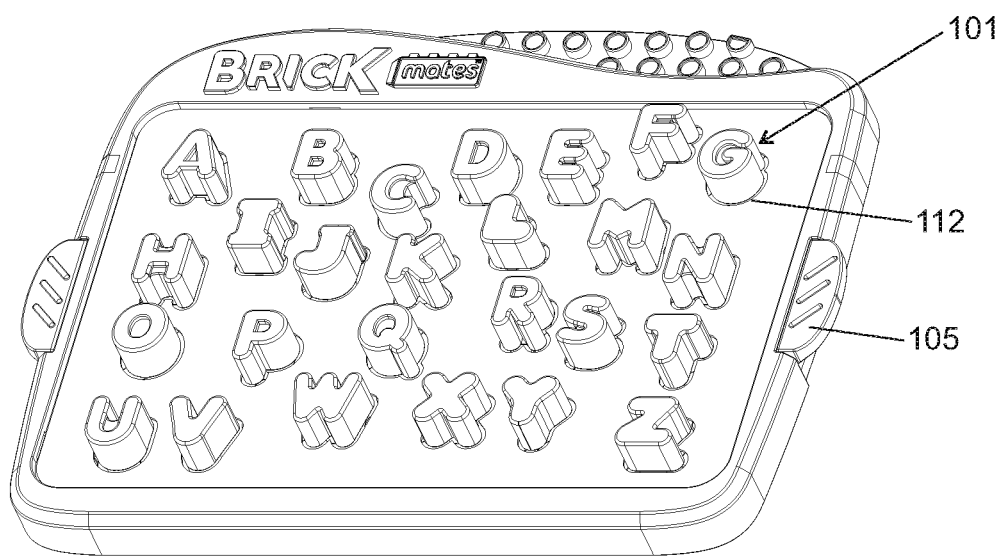
FIG. 7 is a front perspective view of the assembled second embodiment of the inventive puzzle, showing a second pre-determined design.
Figure 18:
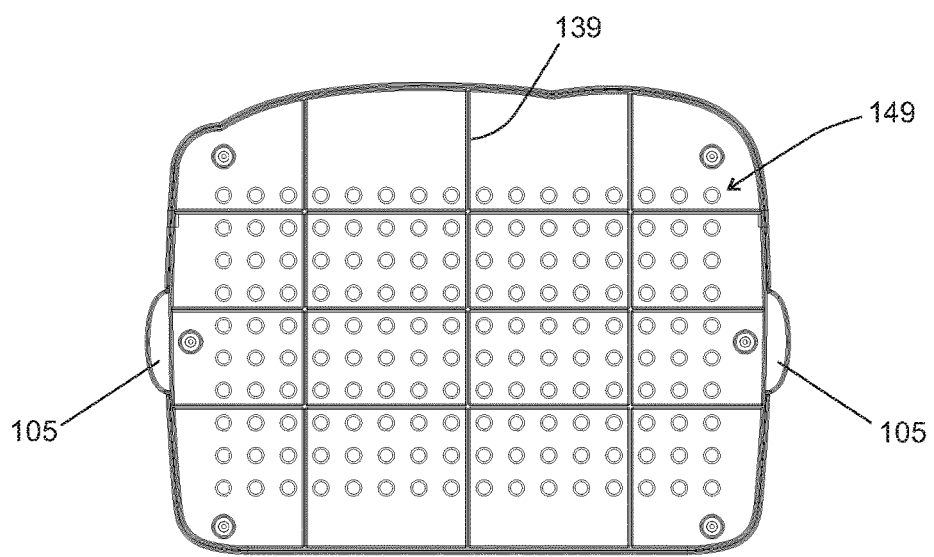
FIG. 18 is a back view of the second embodiment of the inventive puzzle.
Figure 19:
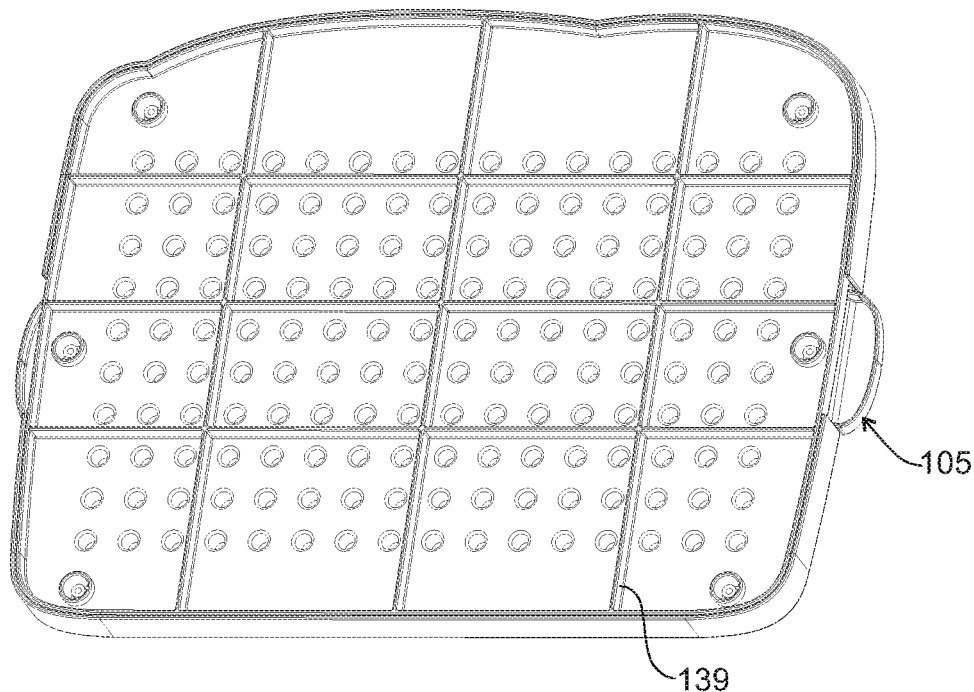
FIG. 19 is a back perspective view of the inventive puzzle.
Figure 20:
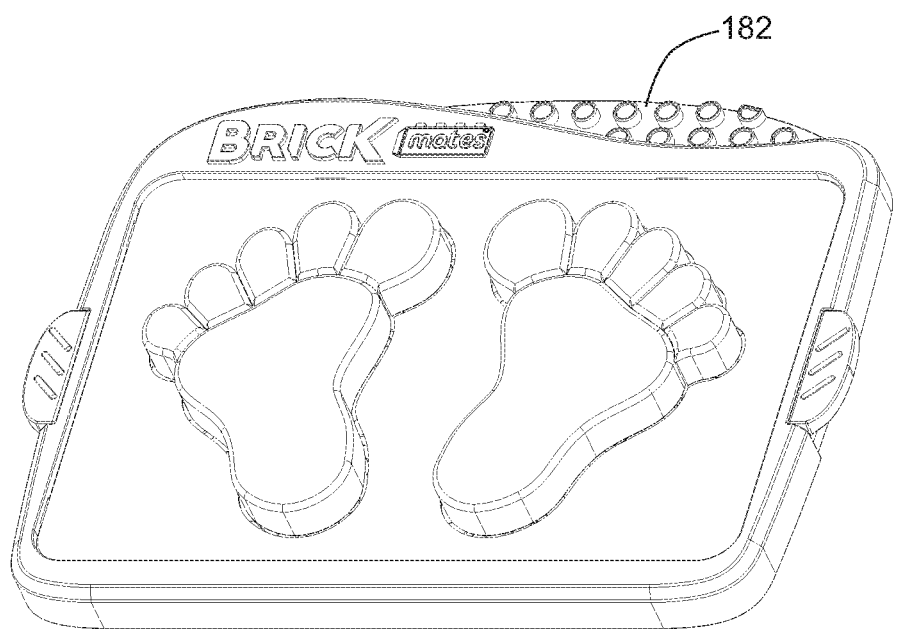
FIGS. 20-24 are front perspective views of the inventive puzzle, showing, respectively, a third, fourth, fifth, sixth, and seventh pre-determined design.
Figure 21:
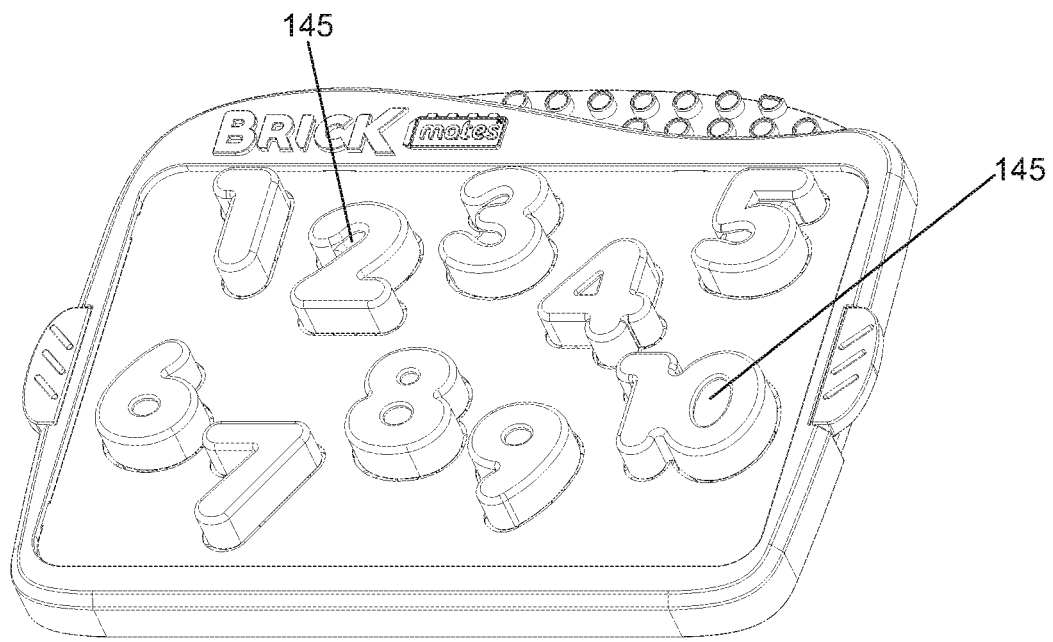
Figure 22:
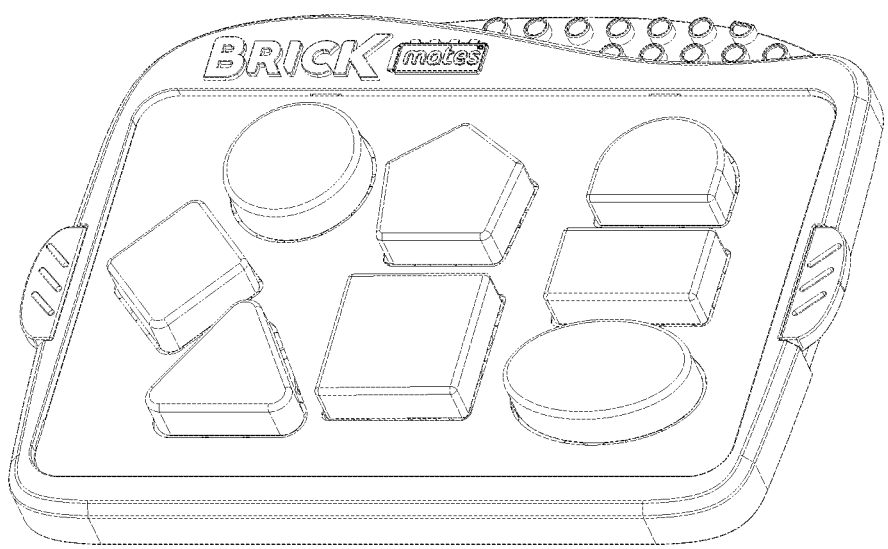
Figure 23:
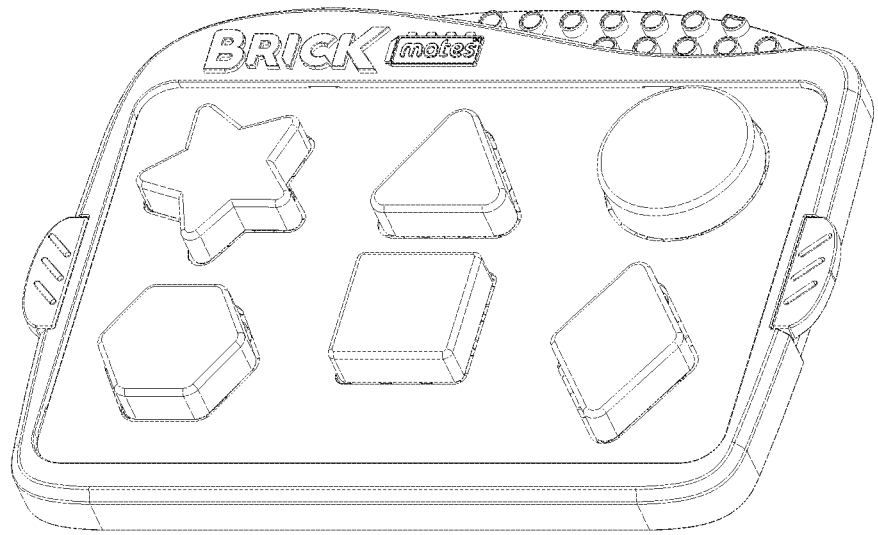
Figure 24:
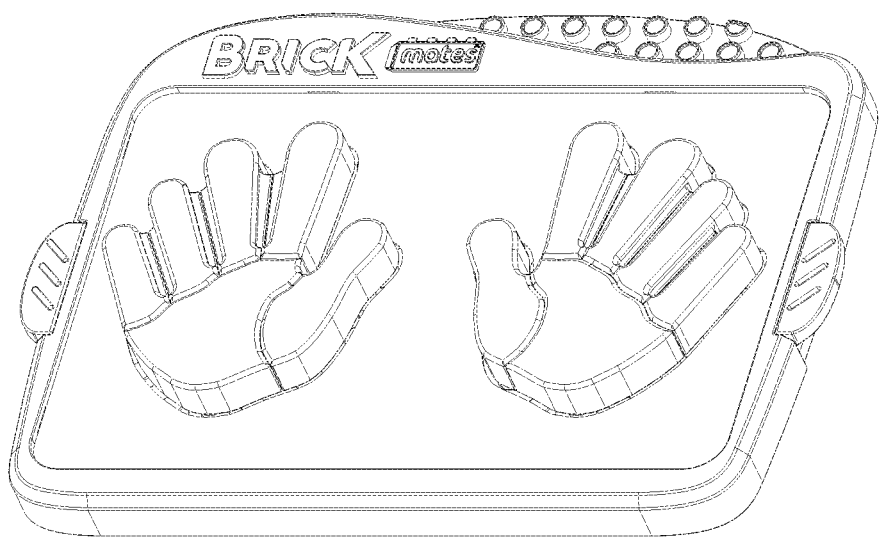

In some aspects, the back baseplate 130 may include a back baseplate reinforcement 139 such as on the underside 149 of back baseplate foundation 131 as seen in FIG. 18, or it may not require visually detectable reinforcement, as seen in FIG. 6. If included for sturdiness or robustness, the back baseplate reinforcement 139 can be area of thicker plastic forming a strengthening or underpinning structure, which is formed integrally when molding the back baseplate 130. The back baseplate reinforcement 139 may be created in any of various shapes or patterns, such as a honeycomb, grid (as shown), striated pattern, or may merely be a strengthening of the back baseplate 130 material.

The invention illustratively disclosed herein suitably may be practiced in the absence of any element which is not specifically disclosed herein. The mirror image of each design is also disclosed.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. A puzzle unit, comprising:
   a two-part base comprising:
   a back baseplate comprising:
   a front surface;
   a back surface; and
   multiple baseplate male studs protruding forwardly from said front surface; and
   a front base section comprising:
   at least one puzzle piece-receiving hole defined by a puzzle piece-receiving hole edge forming a particular shape;
   a lip projecting inwardly from each of said at least one puzzle piece-receiving hole; and
   an outer frame comprising side flanges having lever-accommodating openings on two opposing lateral sides; and
   two opposing puzzle releasing mechanisms, each of said puzzle releasing mechanisms function as a lever and comprise an inner engagement portion configured to engage with said front base section and an outer handle portion sized to fit into one of said lever-accommodating openings; and
   at least one puzzle piece having an outer shape that corresponds to said particular shape; wherein said at least one puzzle piece comprises at least one rear-facing engaging mechanism configured to engage with at least one of said multiple baseplate male studs.

2. The puzzle unit as recited in claim 1, wherein:
said back baseplate further comprises multiple back baseplate front-to-back attachment mechanisms disposed on said front surface; and
said front base section further comprises multiple front base front-to-back attachment mechanisms; wherein said front base front-to-back attachment mechanisms and said back baseplate front-to-back attachment mechanisms together form complementary attachment mechanisms.

3. The puzzle unit as recited in claim 2, wherein said complementary attachment mechanisms allow said front base section to move a limited distance from said back baseplate.

4. The puzzle unit as recited in claim 2, wherein said complementary attachment mechanisms comprise multiple slide-able shaft male connectors and multiple slide-able receptacle female connectors.

5. The puzzle unit as recited in claim 1, wherein said two opposing puzzle releasing mechanisms function to increase the distance between said front base section and said back baseplate to move said front base section and said back baseplate to a releasable position in which said at least one rear-facing engaging mechanism of said at least one puzzle piece is disengaged from said at least one of said multiple baseplate male studs.

6. The puzzle unit as recited in claim 1, wherein said two opposing puzzle releasing mechanisms function to decrease the distance between said front base section and said back baseplate to move said front base section and back baseplate to an attachable position in which said at least one rear-facing engaging mechanism of said at least one puzzle piece is manually engageable with said at least one of said baseplate male studs.

7. The puzzle unit as recited in claim 1, wherein, when said front base section and said back baseplate are in an attachable position, said lip is positioned adjacent to said front surface of said back baseplate.

8. The puzzle unit as recited in claim 1, wherein:
said puzzle piece further comprises a side wall with a back outer edge; and when said front base section and said back baseplate are in an attachable position and said puzzle piece rear-facing engaging mechanism is attached to at least one of said multiple baseplate male studs, said lip is positioned adjacent to said front surface of said back baseplate and below said puzzle piece back outer edge.

9. The puzzle unit as recited in claim 1, wherein each of said two opposing puzzle releasing mechanisms are pivotally attached to said back baseplate.

10. The puzzle unit as recited in claim 1, wherein:
each of said two opposing puzzle releasing mechanisms comprises a handle cylindrical portion; and
said front base section further comprises two release receivers on opposing sides of said base section; each of said two release receivers configured with two aligned slots that accommodate said handle cylindrical portion.

11. The puzzle unit as recited in claim 1, wherein said outer handle portion is positioned within one of said side flange lever-accommodating openings.

12. A puzzle system, comprising:
a two-part base comprising:
a back baseplate comprising a front surface, multiple baseplate male studs extending forwardly from said front surface, and multiple back baseplate front-to-back attachment mechanisms disposed on said front surface; and
a front base section attachable to said back baseplate comprising an inner surface, an outer surface, at least one puzzle piece-receiving hole having a pre-defined shape and defined by a puzzle piece-receiving hole edge, a lip projecting inwardly from said puzzle piece-receiving hole edge, and an outer frame comprising side flanges having lever-accommodating openings on two opposing lateral sides; and
at least one puzzle piece having an outer shape that corresponds to said pre-defined shape; wherein said at least one puzzle piece comprises at least one rear-facing engaging mechanism configured to engage with at least one of said multiple baseplate male studs; and
two opposing puzzle releasing mechanisms functioning as levers, each of said puzzle releasing mechanism comprising an inner engagement portion configured to engage with said front base section and an outer handle portion sized to fit into one of said lever-accommodating openings; wherein each of said two opposing puzzle releasing mechanisms are pivotally attached to said back baseplate.

13. The puzzle unit as recited in claim 12, wherein said two opposing puzzle releasing mechanisms function to increase the distance between said front base section and said back baseplate to move said front base section and said back baseplate to a releasable position in which said at least one rear-facing engaging mechanism of said at least one puzzle piece is disengaged from said at least one of said multiple baseplate male studs.

14. The puzzle unit as recited in claim 12, wherein said two opposing puzzle releasing mechanisms function to decrease the distance between said front base section and said back baseplate to move said front base section and back baseplate to an attachable position in which said at least one rear-facing engaging mechanism of said at least one puzzle piece is manually engageable with said at least one of said multiple baseplate male studs.

15. The puzzle unit as recited in claim 14, wherein, when said front base section and said back baseplate are in said attachable position, portions of said lip are positioned adjacent to said front surface of said back baseplate.

16. The puzzle unit as recited in claim 12, wherein said complementary front-to-back attachment mechanisms allow said front base section to move a limited distance from said back baseplate.

17. The puzzle unit as recited in claim 12, wherein said complementary front-to-back attachment mechanisms comprise multiple slide-able shaft male connectors and multiple slide-able receptacle female connectors.

18. The puzzle unit as recited in claim 12, wherein each of said two opposing puzzle releasing mechanisms are pivotally attached to said back baseplate.

19. The puzzle unit as recited in claim 12, wherein:
each of said two opposing puzzle releasing mechanisms comprises a handle cylindrical portion; and
said front base section further comprises two release receivers on opposing sides of said base section; each of said two release receivers configured with two aligned slots that accommodate said handle cylindrical portion.

20. A puzzle unit, comprising:
a two-part base comprising:
- a back baseplate comprising:
  - a front surface;
  - a back surface;
  - multiple baseplate male studs protruding forwardly from said front surface; and
  - multiple back baseplate front-to-back attachment mechanisms protruding forwardly from said front surface; and
- a front base section comprising:
  - at least one puzzle piece-receiving hole defined by a puzzle piece-receiving hole edge forming a particular shape;
  - a lip projecting inwardly from each of said at least one puzzle piece-receiving hole;
  - multiple front base front-to-back attachment mechanisms; wherein said front base front-to-back attachment mechanisms and said back baseplate front-to-back attachment mechanisms together form complementary front-to-back attachment mechanisms; and
  - an outer frame comprising side flanges having lever-accommodating openings on two opposing lateral sides;
two opposing puzzle releasing mechanisms pivotably attached to said back baseplate; each of said puzzle releasing mechanisms functioning as a lever and comprising an inner engagement portion configured to engage with said front base section and an outer handle portion extending outwardly through one of said lever-accommodating openings; wherein said two opposing puzzle releasing mechanisms function to increase the distance between said front base section and said back baseplate to move said front base section and said back baseplate to a releasable position in which said at least one rear-facing engaging mechanism of said at least one puzzle piece is disengaged from said at least one of said multiple baseplate male studs; wherein said complementary front-to-back attachment mechanisms allow said front base section to move a limited distance from said back baseplate; and
at least one puzzle piece having an outer shape that corresponds to said particular shape; wherein said at least one puzzle piece comprises a side wall with a back outer edge and at least one rear-facing engaging mechanism configured to engage with at least one of said multiple baseplate male studs; wherein when said front base section and said back baseplate are in an attachable position and said puzzle piece rear-facing engaging mechanism is attached to at least one of said multiple baseplate male studs, said lip is positioned adjacent to said front surface of said back baseplate and below said puzzle piece back outer edge.

* * * * *